US009599762B2

(12) United States Patent
Lee et al.

(10) Patent No.: US 9,599,762 B2
(45) Date of Patent: Mar. 21, 2017

(54) WIRE GRID POLARIZER, LIQUID CRYSTAL DEVICE INCLUDING THE WIRE GRID POLARIZER, 3-D STEREOSCOPIC IMAGE DISPLAY DEVICE INCLUDING THE WIRE GRID POLARIZER, AND METHOD OF MANUFACTURING THE WIRE GRID POLARIZER (75) Inventors: Young Jae Lee, Seoul (KR); Jin Su Kim, Seoul (KR); Jun Lee, Seoul (KR); Ki-Cheol Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 1136 days.

(21) Appl. No.: 13/263,814

(22) PCT Filed: Apr. 12, 2010

(86) PCT No.: PCT/KR2010/002236
§ 371 (c)(1),
(2), (4) Date: Dec. 29, 2011

(87) PCT Pub. No.: WO2010/117249
PCT Pub. Date: Oct. 14, 2010

(65) Prior Publication Data
US 2012/0086887 A1  Apr. 12, 2012

(30) Foreign Application Priority Data
Apr. 10, 2009  (KR) ........................ 10-2009-0031463

(51) Int. Cl.
*G02F 1/1335*   (2006.01)
*G02B 5/30*     (2006.01)
*G02B 27/26*    (2006.01)

(52) U.S. Cl.
CPC ..... *G02B 5/3058* (2013.01); *G02F 1/133528* (2013.01); *G02B 27/26* (2013.01); *G02F 2001/133548* (2013.01)

(58) Field of Classification Search
CPC ............ G02F 1/1335; G02F 1/133528; G02F 2001/133548; G02B 27/26; G02B 5/30; C23F 1/02
(Continued)

(56) References Cited

U.S. PATENT DOCUMENTS

2006/0056024 A1   3/2006 Ahn et al.
2006/0119937 A1*  6/2006 Perkins et al. ................ 359/486
(Continued)

FOREIGN PATENT DOCUMENTS

CN   19-52700 A      4/2007
JP   2006-039545 A   2/2006
(Continued)

OTHER PUBLICATIONS

International Search Report in International Application No. PCT/KR2010/002236, filed Apr. 12, 2010.
(Continued)

*Primary Examiner* — Charles Chang
(74) *Attorney, Agent, or Firm* — Saliwanchik, Lloyd & Eisenschenk (57) ABSTRACT The present invention relates to a wire grid polarizer capable of securing a high brightness and reducing the number of processes, a liquid crystal device including the wire grid polarizer, and a method of manufacturing the wire grid polarizer. According to the present invention, the wire grid polarizer, including first grids arranged in parallel at certain intervals over a substrate and second grids formed on the first grids, can be formed using only an imprint process, a deposition process, and a wet etch process. Accordingly, the number of processes and the process costs and time can be reduced, and high reliability can be guaranteed.

15 Claims, 7 Drawing Sheets

(58) Field of Classification Search
USPC .................................................. 349/96–98
See application file for complete search history.

(56) References Cited

U.S. PATENT DOCUMENTS

| | | | |
|---|---|---|---|
| 2008/0055723 A1* | 3/2008 | Gardner | G02B 5/3058 359/487.03 |
| 2008/0129931 A1* | 6/2008 | Takahashi | G02B 5/3058 349/96 |
| 2009/0041971 A1* | 2/2009 | Wang | G02B 5/1809 428/54 |
| 2009/0310044 A1* | 12/2009 | Lee | G02B 27/26 349/15 |
| 2011/0096396 A1 | 4/2011 | Kaida et al. | |

FOREIGN PATENT DOCUMENTS

| | | |
|---|---|---|
| JP | 2006-201782 A | 8/2006 |
| JP | 2008-096677 A | 4/2008 |
| JP | 2008-102416 A | 5/2008 |
| JP | 2008-181113 A | 8/2008 |
| JP | 2008-268298 A | 11/2008 |
| JP | 2009-075265 A | 4/2009 |
| JP | 2009210750 A | 9/2009 |
| KR | 10-2007-0042079 A | 4/2007 |
| KR | 10-2008-0101833 A | 11/2008 |
| KR | 10-2008-0111330 A | 12/2008 |
| KR | 10-2009-0025797 A | 3/2009 |
| KR | 10-2009-0110731 A | 10/2009 |
| TW | 200728786 A | 8/2007 |
| TW | 201007230 A | 2/2010 |
| WO | WO-2009/041646 A1 | 4/2009 |

OTHER PUBLICATIONS

Office Action dated Jun. 20, 2016 in Korean Application No. 10-2010-0033340.

* cited by examiner

WIRE GRID POLARIZER, LIQUID CRYSTAL DEVICE INCLUDING THE WIRE GRID POLARIZER, 3-D STEREOSCOPIC IMAGE DISPLAY DEVICE INCLUDING THE WIRE GRID POLARIZER, AND METHOD OF MANUFACTURING THE WIRE GRID POLARIZER

CROSS-REFERENCE TO RELATED APPLICATIONS

This application is the U.S. national stage application of International Patent Application No. PCT/KR2010/002236, filed Apr. 12, 2010, which claims priority to Korean Application No. 10-2009-0031463, filed Apr. 10, 2009, the disclosures of each of which are incorporated herein by reference in their entirety.

BACKGROUND OF THE INVENTION

Field of the Invention

The present invention relates to a wire grid polarizer capable of obtaining high brightness and reducing the number of processes, a liquid crystal device including the wire grid polarizer, and a method of manufacturing the wire grid polarizer.

Discussion of the Related Art

In general, a polarizer or a polarizing element refers to an optical element which extracts straight-light polarized light, having a certain vibration direction, from non-polarized light such as natural light. A wire grid polarizer which is one of the kinds of the optical element is an optical element which produces polarized light using conductive wire grids. The wire grid polarizer has been used as a reflection type polarizer useful in the wavelength range of the infrared region because it has a higher polarization separation characteristic than other polarizers.

A process of forming the wire grid polarizer includes 6 to 7 processes, such as a process of depositing metal on a substrate, a photoresist coating process, a photolithography process, a photoresist development process, a metal layer etch process, and a photoresist strip process. Accordingly, there are problems in that the time and the costs are increased.

Further, the most important factor to determine the performance of the wire grid polarizer is the relationship between the wavelength of incident light and the interval between wire grids. That is, if the pitch of the wire grid is not small enough, desired effects are difficult to obtain because the incident light is not polarized, but diffracted. As described above, important factors in the polarization characteristic of the wire grid polarizer include the pitch of the wire grid and the width and height of the wire grid. It is, however, difficult to control the width and height of the wire grid using the existing process.

SUMMARY OF THE INVENTION

Accordingly, the present invention has been made keeping in mind the above problems occurring in the prior art, and an object of the present invention is to provide a manufacture process which is capable of reducing the number of processes and the process costs and time and guaranteeing reliability by forming a wire grid polarizer, including first grids arranged in parallel at certain intervals on a sheet and second grids formed on the first grids, using only an imprint process, a deposition process, and a wet etch process.

In particular, another object of the present invention is to provide a wire grid polarizer including second grids configured to improve brightness and to maximize polarization efficiency through only a wet etch process, thereby being capable of improving transmittance.

In accordance with an aspect of the present invention, there is provided a wire grid polarizer, including a first grid layer comprising at least one first grid, having a certain pitch and height, over a substrate and a second grid layer comprising at least one second grid, having a certain pitch and height, on the first grid, wherein the ratio of the width of the first grid to the width of the second grid satisfies 1:(0.2 to 1.5).

In this case, the first grid and the first grid layer of the wire grid polarizer can be made of a polymer material, and the second grid thereof can be made of a metal material.

In particular, in the above-described structure, the structure of the second grid can be formed such that the ratio of the width of the second grid to the interval between the second grids satisfies 1:(0.2 to 1.5), the ratio of the width of the second grid to the height of the second grid satisfies 1:(1 to 5), or the ratio of the pitch of the second grid to the height of the second grid satisfies 1:(1 to 5).

Furthermore, the wire grid polarizer of the above-described structure according to the present invention can be formed such that the ratio of the width of the first grid and the interval between the first grid satisfies 1:(0.2 to 1.5), or the ratio of the width of the first grid to the height of the first grid satisfies 1:(0.2 to 5).

In either case, the pitch of the second grid or the pitch of the first grid can be formed in the range of 50 nm to 1 μm.

Moreover, the cross section of each of the first and second grids according to the present invention can have a circle, ellipse, or polygon.

The wire grid polarizer having the above-described structure can be formed using the following process. More particularly, a manufacture process according to the present invention can include a first step of forming a plurality of first grids, each having a certain pitch, by processing a first grid base layer stacked on a substrate, a second step of forming a second grid base layer on the first grids, and a third step of forming a plurality of second grids by etching the second grid base layer, wherein the ratio of the width of the first grid to the width of the second grid satisfies 1:(0.2 to 1.5).

In this case, in the first step, the plurality of first grids can be formed in regions, respectively corresponding to a plurality of grooves, on the first grid base layer made of a polymer material by pressurizing an imprint mold having the plurality of grooves.

Further, in the second step, a material layer made of a metal material can be formed through a deposition process.

In particular, in the above-described manufacture process, in the first step, it is preferred that the first grids be formed such that the ratio of the width of the first grid to the interval between the first grids satisfies 1:(0.2 to 1.5) or the ratio of the width of the first grid to the height of the first grid satisfies 1:(0.2 to 5).

Moreover, in the manufacture process according to the present invention, the third step can be performed using a wet etch process, and the third step can be performed using an etch process such that the ratio of the width of the second grid to the interval between the second grids satisfies 1:(0.2 to 1.5), the ratio of the width of the second grid to the height of the second grid satisfies 1:(1 to 5), or the ratio of the pitch of the second grid to the height of the second grid satisfies 1:(1 to 5).

The wire grid polarizer having the above-described structure according to the present invention can be applied to liquid crystal devices.

More particularly, the liquid crystal device can include a liquid crystal display panel, a backlight unit configured to supply light to the liquid crystal display panel, and a wire grid polarizer according to the present invention, wherein the wire grid polarizer is formed on an upper or lower part of the liquid crystal display panel or on any one surface of a plurality of optical sheets included in the backlight unit and configured to increase efficiency of light.

The wire grid polarizer included in the liquid crystal device, as described above, can be formed such that the ratio of the width of the first grid to the interval between the first grids satisfies 1:(0.2 to 1.5) or the ratio of the width of the first grid to the height of the first grid satisfies 1:(0.2 to 5).

The wire grid polarizer according to the present invention can be applied to a device for displaying a 3-D stereoscopic image in addition to the above-described liquid crystal device.

BRIEF DESCRIPTION OF THE DRAWINGS

The above and other objects and features of the present invention will become apparent from the following description of preferred embodiments given in conjunction with the accompanying drawings, in which.

DETAILED DESCRIPTION OF THE EMBODIMENTS

Hereinafter, embodiments of the present invention will be described in detail with reference to the accompanying drawings so that they can be readily implemented by those skilled in the art.

Figure 1:
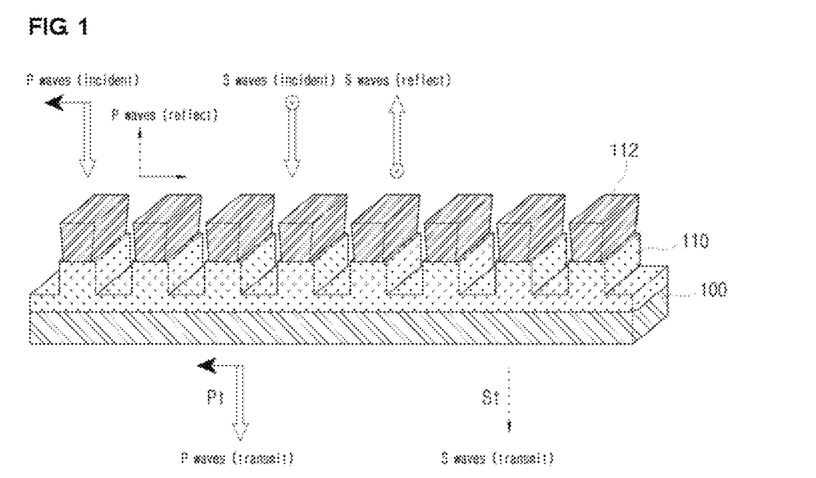
FIG. 1 is a perspective view showing the operating principle of a wire grid polarizer according to an embodiment of the present invention.
Figure 2:
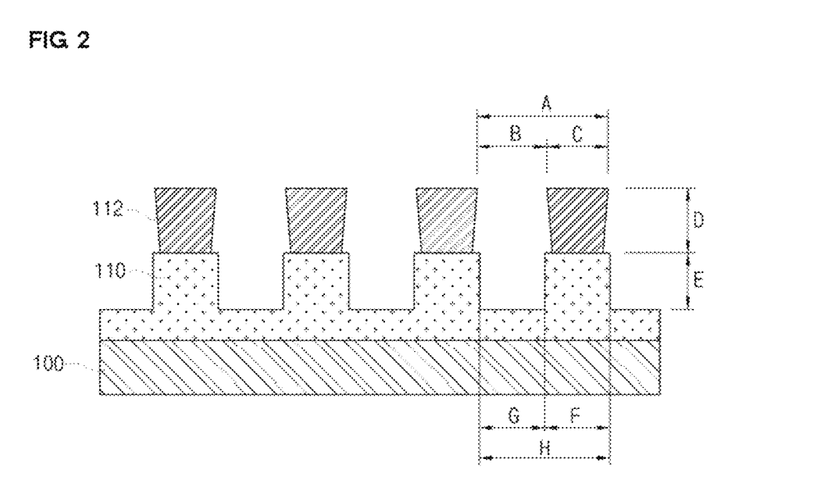
FIG. 2 is a cross-sectional view illustrating the height and width of each of the first and second grids of the wire grid polarizer shown in FIG. 1.

A plurality of wire grids according to the present invention is formed in at least two layers. The two layers, as shown in FIGS. 1 and 2, include a first grid layer, including a plurality of first grids 110 arranged in parallel at certain intervals over a substrate 100, and a second grid layer including a plurality of second grids 112 formed on the first grids 110 of the first grid layer. That is, it is preferred that the first grid layer including the at least one first grid 110, having a certain pitch H, a width F, and a height E, be formed over the substrate 100 and the second grid layer including the at least one second grid 112, having a certain pitch A, a width C, and a height D, be formed on the first grid 110. In particular, it is preferred that the first grids and the second grids be formed so that the ratio of the width F of the first grid to the width C of the second grid satisfies F:C=1:(0.2 to 1.5).

In this case, the second grids 112 can be made of a metal material and formed so that the ratio of the width C of the second grid 112 to the interval B between the second grids 112 satisfies C:B=1:(0.2 to 1.5), the ratio of the width C of the second grid 112 to the height D of the second grid 112 satisfies C:D=1:(1 to 5), or the ratio of the pitch A of the second grid 112 to the height D of the second grid 112 satisfies A:D=1:(1 to 5). The above structure can maximize transmittance, brightness, and polarization efficiency.

Hereinafter, the constructions and operations of the present invention are described in more detail with reference to the accompanying drawings. In a description referred to the accompanying drawings, the same elements are assigned the same reference numerals irrespective of their reference numerals, and a redundant description thereof is omitted. Terminologies, such as the first and the second, can be used to describe a variety of elements, but the elements should not be construed to be defined by the terminologies. The terminologies are used only to distinguish one element from the other element.

FIG. 1 is a perspective view showing the operating principle of the wire grid polarizer according to an embodiment of the present invention, and FIG. 2 is a cross-sectional view illustrating the height and width of each of the first and second grids of the wire grid polarizer shown in FIG. 1.

Referring to FIGS. 1 and 2, the wire grid polarizer according to the present invention includes the plurality of wire grids (i.e., grid structures) arranged in parallel at certain intervals on the substrate 100. In such a wire grid polarizer, if a pitch (i.e., a distance in which the width of a grid and an interval between the grids are added) is much smaller than the wavelength of incident light, when light of a non-polarization state is incident, the wire grid polarizer transmits a component (i.e., P-polarized light) having a vector orthogonal to the conductive wire grid, but reflects a component (i.e., S-polarized light) having a vector parallel to the wire grid.

The optical properties of the wire grid polarizer can be evaluated based on its transmittance, polarization efficiency, a polarization extinction ratio, and so on. The polarization efficiency is (Tp−Ts)/(Tp+Ts) (where Tp is P-wave transmittance and Ts is S-wave transmittance). The polarization extinction ratio is Tp/Ts. That is, a necessary use of the wire grid polarizer can be determined by evaluating the above three characteristics.

The plurality of wire grids according to the present invention are formed in at least two layers. The at least two layers, as shown in FIG. 1, include the first grid layer, including the plurality of first grids 110 arranged in parallel at certain intervals over the substrate 100, and the second grid layer including the plurality of second grids 112 formed on the first grids 110 of the first grid layer.

The optical properties of the wire grid polarizer vary according to the widths F and C and the heights E and D of the first and second grids 110 and 112 or the pitch H of the first grid 110 and the pitch A of the second grid 112. Here, the pitch refers to the sum of the width of each grid and the distance to a neighboring grid. In the illustrated structures, it is hereinafter assumed that the pitch H of the first grid 110 refers to the sum of the interval G between the first grids and the width F of the first grid and the pitch A of the second grid 112 refers to the sum of the interval B between the second grids and the width C of the second grid.

In such a wire grid polarizer, transmittance can be controlled according to the height and width of the grid. If the width of the grid is increased for the same pitch, the transmittance is reduced and the polarization extinction ratio is increased.

If the pitch is reduced in order to guarantee maximum polarization efficiency, the polarization characteristic is increased. If the grids are formed to have the same interval and the same width, the polarization characteristic is improved with an increase in the height of the grid. If the grids are formed to have the same interval and the same height, the polarization characteristic is improved with an increase in the width of the grid.

In order to obtain a maximum brightness as described above, the grids should be formed by optimally controlling the pitch of each grid and the height and width of the grid. The widths F and C and the heights E and D of the first and second grids 110 and 112 or the pitches H and A of the first and second grids 110 and 112 can be determined as in the following Table 1 by taking the above-described conditions into consideration. In the illustrated structures, B refers to the interval between the second grids, and G refers to the interval between the first grids.

TABLE 1

| | SECOND GRID | FIRST GRID |
|---|---|---|
| PITCH = GRID WIDTH + INTERVAL | A = C + B | H = F + G |
| PITCH | 50 nm~1 µm | 50 nm~1 µm |
| GRID WIDTH:INTERVAL | C:B  1:0.2~1.5 | F:G  1:0.2~1.5 |
| GRID WIDTH:HEIGHT | C:D  1:1~5 | F:E  1:0.2~5 |
| PITCH:HEIGHT | A:D  1:1~5 | |
| FIRST GRID WIDTH: SECOND GRID WIDTH | F:C = 1:0.2~1.5 | |

Referring to Table 1 and FIG. 2, it is preferred that the wire grid polarizer according to the present invention includes the first grid layer including the at least one first grid 110, having a certain pitch H, the width F, and the height E, arranged over the substrate 100 and the second grid layer including the at least one second grid 112, configured to have a certain pitch A, the width C, and the height D and formed on the first grid 110. In particular, it is preferred that the first grid 110 and the second grid 112 be formed so that the ratio of the width F of the first grid 110 to the width C of the second grid 112 satisfies F:C=1:(0.2 to 1.5).

Furthermore, the second grids 112 are made of a metal material and can be formed so that the ratio of the width C of the second grid to the interval B between the second grids satisfies C:B=1:(0.2 to 1.5), the ratio of the width C of the second grid to the height D of the second grid satisfies C:D=1:(1 to 5), or the ratio of the pitch A of the second grid to the height D of the second grid satisfies A:D=1:(1 to 5).

The above structure can maximize transmittance, brightness, and polarization efficiency. In this case, it is preferred that the pitch A of the second grid 112 range from 50 nm to 1 µm.

In particular, the results of measurement for the degree of improved transmittance by taking only the ratio of the pitch A of the second grid 112 to the height D of the second grid into consideration are described below with reference to FIG. 3.

Figure 3:
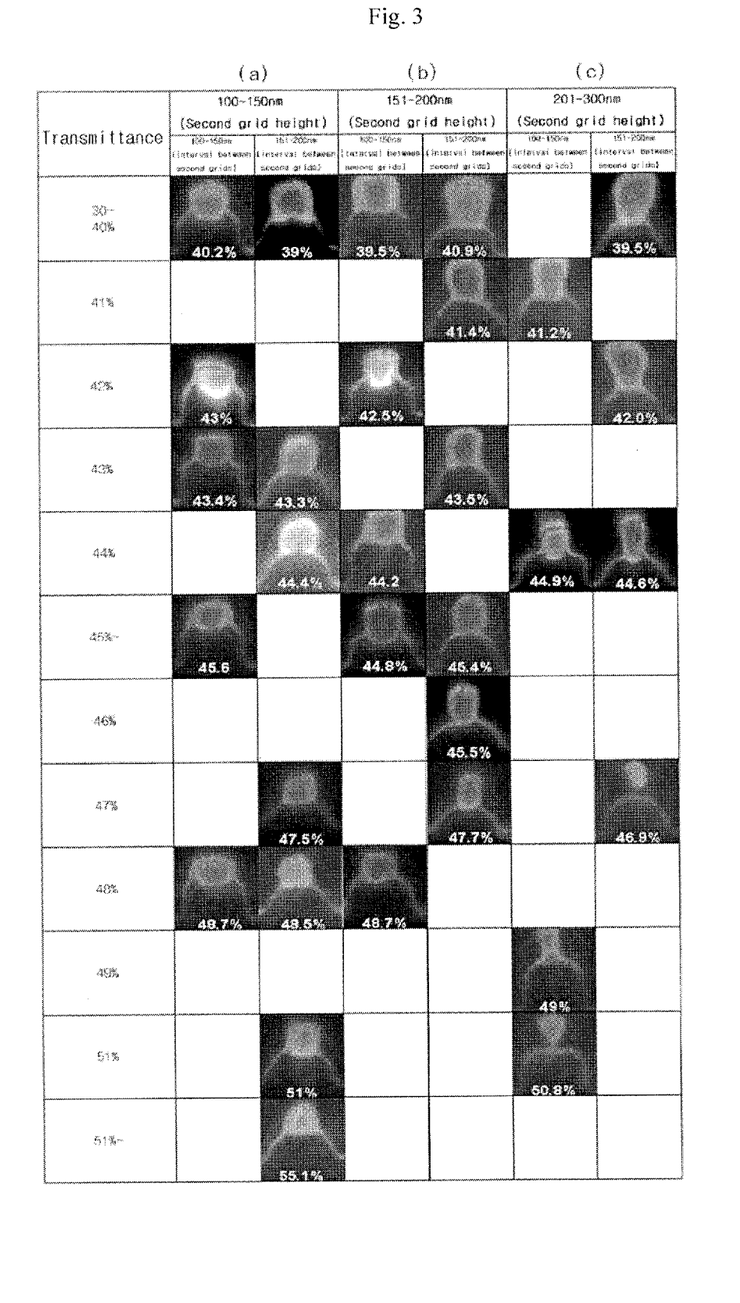
FIG. 3 is a diagram showing transmittance according to the height and width of the second grid of the wire grid polarizer according to the present invention.

FIG. 3 shows the results of measurement when the ratio of the pitch A of the second grid and the height D of the second grid satisfies A:D=1:(1 to 5) in a preferred example of the present invention.

FIG. 3(a) shows transmittance according to a reduction in the width C of the second grid 112 in the case in which the height D of the second grid 112 was 100 to 150 nm and the pitch A of the second grid 112 was 100 to 200 nm.

Further, FIG. 3(b) shows transmittance according to a reduction in the width C of the second grid 112 in the case in which the height D of the second grid 112 was 151 to 200 nm and the pitch A of the second grid 112 was 100 to 200 nm.

Furthermore, FIG. 3(c) shows transmittance according to a reduction in the width C of the second grid 112 in the case in which the height D of the second grid 112 was 201 to 300 nm and the pitch A of the second grid 112 was 100 to 200 nm. That is, from FIGS. 3(a), 3(b), and 3(c), it can be seen that the transmittance is improved with a gradual reduction in the width C of the second grid 112 when the height D of the second grid 112 is constant in the range of A:D=1:(1 to 5).

Figure 4:
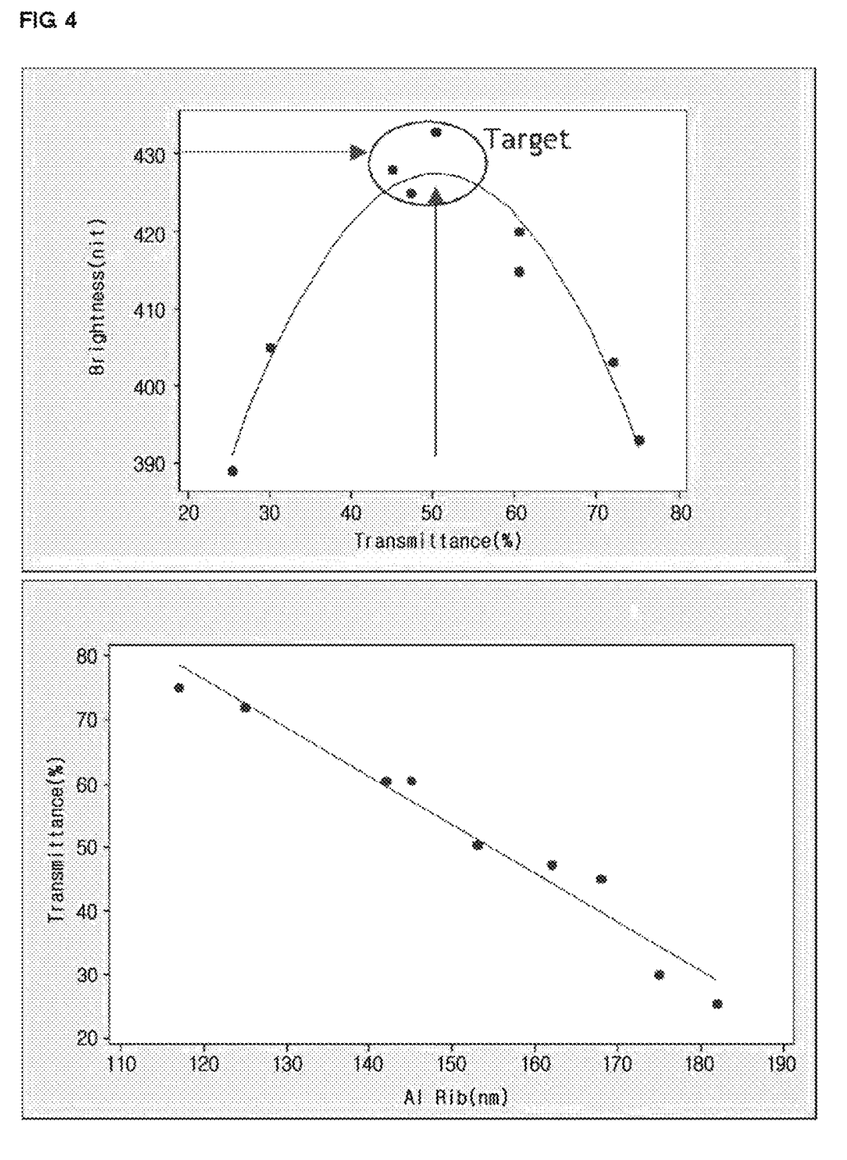
FIG. 4 is a graph showing transmittance and brightness.

For example, FIG. 4 shows a high brightness when transmittance is 40 to 60%, preferably, 50%. Accordingly, it can be seen that a high transmittance can be obtained if the first and second grids 110 and 112 are formed to have the above-described heights E and D and the above-described widths F and C or the second grid 112 is formed to have the above-described pitch A.

Further, Table 2 shows transmittance and polarization efficiency according to the pitch A of the second grid 112 of the present invention.

TABLE 2

| | PITCH (A) OF SECOND GRID | | | | |
|---|---|---|---|---|---|
| | 100 nm | 120 nm | 150 nm | 200 nm | 250 nm |
| TRANSMITTANCE (%) | 57.66 | 57.42 | 56.60 | 52.4 | 66.9 |
| POLARIZATION EFFICIENCY | 99.9933 | 99.9853 | 99.9733 | 99.7735 | 99.279 |

A maximum optical effect can be realized by controlling the structure of the first grids according to the present invention in addition to the structure of the second grids according to the present invention. To this end, in particular, the first grids 110 according to the present invention are made of a polymer material, and preferably are formed so that the ratio of the width F of the first grid to the interval G between the first grids satisfies F:G=1:(0.2 to 1.5) or the ratio of the width F of the first grid to the height E of the first grid satisfies F:E=1:(0.2 to 5). Furthermore, the first grid according to the present invention can be formed to have the pitch H of 50 nm to 1 µm.

The first grid and the second grid according to the present invention can be formed to have a variety of forms, such as a stripe, a curve, a quadrangle, and a triangle. That is, the cross section of each of the first grid and the second grid can have various forms, such as a circle, an ellipse, or a polygon.

Figure 5:
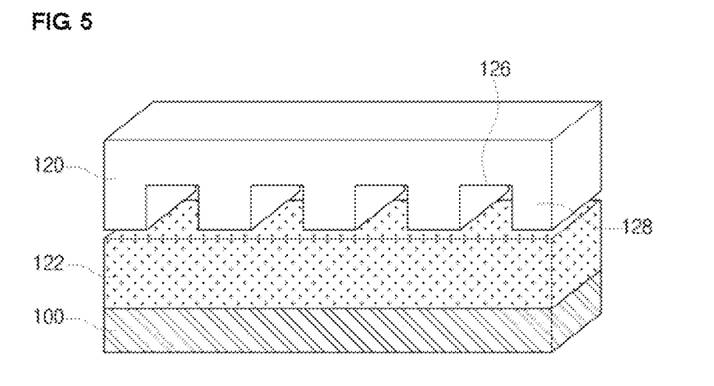
FIGS. 5 to 7 are process diagrams showing a method of manufacturing the wire grid polarizer according to the present invention.
Figure 6:
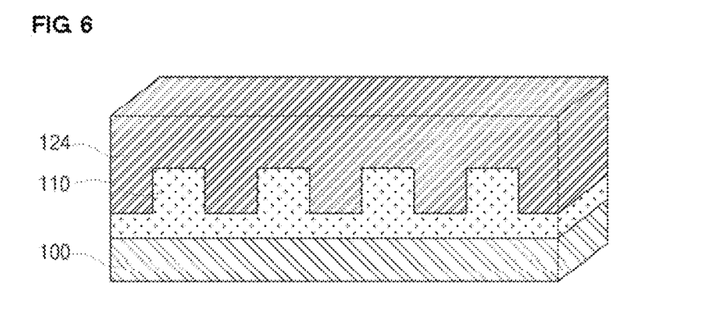
Figure 7:
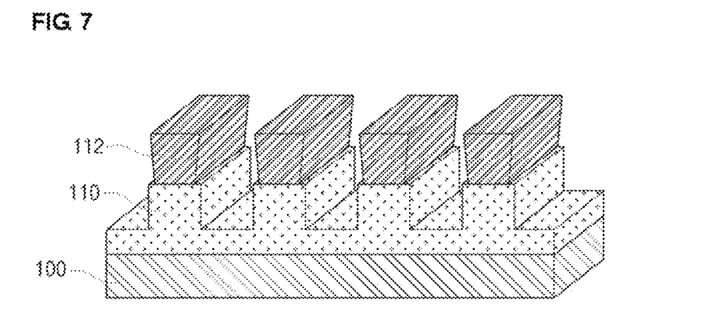

A process of manufacturing the wire grid polarizer according to the present invention is described below with reference to FIGS. 5 to 7. FIGS. 5 to 7 show the process of manufacturing the wire grid polarizer according to the present invention. In the present embodiment, an example in which each of the first grid and the second grid is formed to have a stripe shape is described.

The process of manufacturing the wire grid polarizer according to the present invention includes a first step of forming the plurality of first grids 110, each having a certain pitch, by processing a first grid base layer 122 stacked on the substrate 100, a second step of forming a second grid base layer 124 on the first grids, and a third step of forming the plurality of second grids 112 by etching the second grid base layer 124.

In particular, in this case, it is preferred that the ratio of the width F of the first grid to the width C of the second grid in the third step be F:C=1:(0.2 to 1.5).

Referring to FIG. 5, first, in the first step of the manufacture process according to the present invention, the first grid base layer 122 is formed by coating a polymer material (e.g., UV resin) on the substrate 100. Next, an imprint mold 120, having grooves 126 and projecting parts 128, is aligned over the substrate 100 on which the first grid base layer 122 is coated. Here, the plurality of grooves 126 of the imprint mold 120 is spaced apart one another at certain intervals and repeatedly formed, and the plurality of projecting parts 128 of the imprint mold 120 is spaced apart one another at certain intervals and repeatedly formed. Further, the grooves 126 of the imprint mold 120 correspond to respective places where the first grids 110 will be respectively formed.

In this case, the height and width of each of the grooves 126 of the imprint mold 120 corresponds to the width F and height E of the first grid. It is preferred that the height and width of the groove 126 of the imprint mold 120 satisfies F:E=1:(0.2 to 5) (i.e., the ratio of the height E of the first grid to the width F of the first grid according to the present invention).

That is, in the case in which the first grids are formed using the imprint mold, it is preferred that in the structure of the first grids (i.e., a result of the imprint mold), the imprint grooves and height be controlled so that the ratio of the width F of the first grid to the interval G between the first grids satisfies F:G=1:(0.2 to 1.5) or the ratio of the width F of the first grid to the height E of the first grid satisfies F:E=1:(0.2 to 5).

Further, the grooves 126 of the imprint mold 120 are formed in a stripe shape. The polymer material 122 forming the first grid base layer is pressurized so that it is brought into contact with the grooves 126 of the imprint mold 120 and then subject to UV radiation. Accordingly, the plurality of first grids 110 is formed in the portions where the polymer material 122 corresponds to the grooves 126 of the imprint mold 120.

Next, as shown in FIG. 6, the second grid base layer 124 (i.e., a metal layer) is deposited over the substrate 100 in which the plurality of first grids 110 is formed. As shown in FIG. 7, the second grid base layer 124 is etched to form the second grids 112 on the first grids 110.

More particularly, a wet etch process is performed on the second grid base layer 124 (i.e., a metal layer) deposited over the substrate 100 in which the plurality of first grids 110 is formed, thereby forming the second grids 112.

Further, it is preferred that the wet etch process be performed such that the ratio of the width C of the second grid to the interval B between the second grids satisfies C:B=1:(0.2 to 1.5), the ratio of the width C of the second grid to the height D of the second grid satisfies C:D=1:(1 to 5), or the ratio of the pitch A of the second grid to the height D of the second grid satisfies A:D=1:(1 to 5). Accordingly, the wire grid polarizer in which the second grids 112 are respectively formed on the first grids 110 over the substrate 100 is completed.

As described above with reference to FIGS. 5 to 7, the wire grid polarizer including the first and second grids 110 and 112 can be manufactured using only the imprint process, the deposition process, and the wet etch process. Since the manufacturing process steps can be reduced as described above, the process costs can be reduced and mass production is possible.

Figure 8:
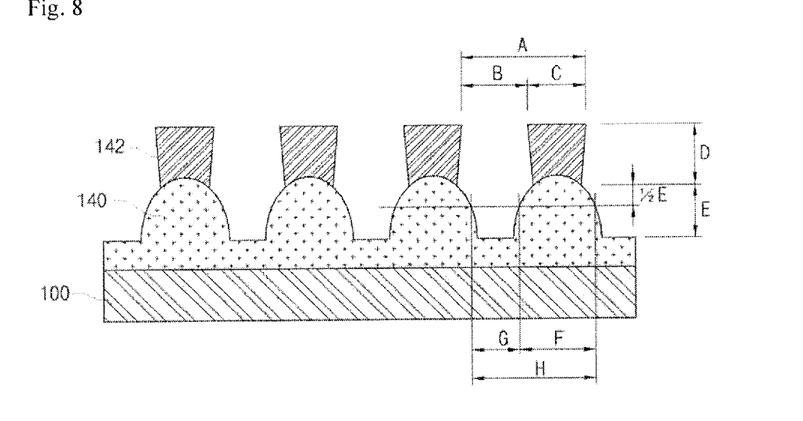
FIG. 8 is a cross-sectional view of a wire grid polarizer in which first grids have a hemispherical pattern according to the present invention.
Figure 9:
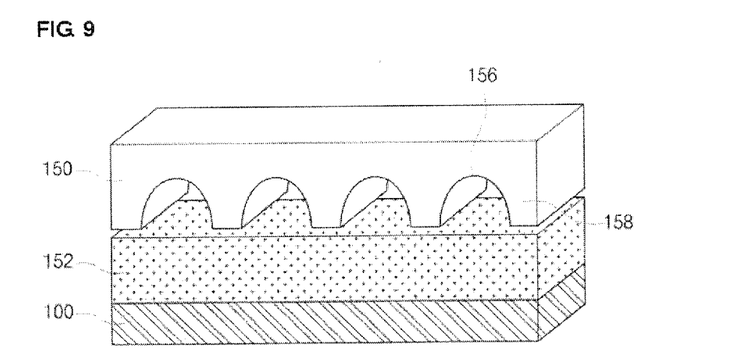
FIGS. 9 to 11 are perspective views showing a method of manufacturing the wire grid polarizer shown in FIG. 8.
Figure 10:
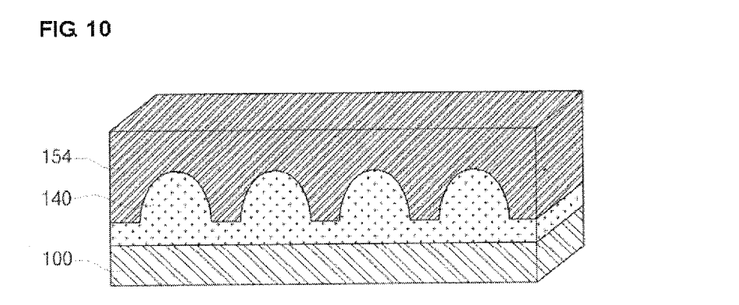
Figure 11:
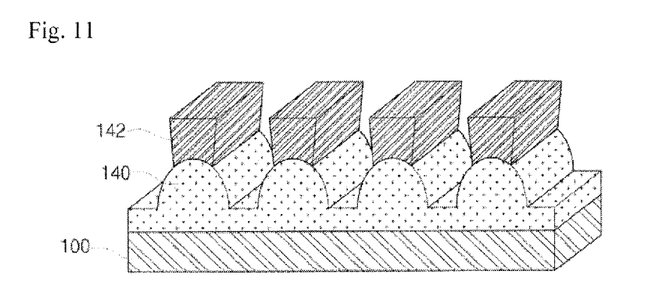

On the one hand, FIG. 8 is a cross-sectional view showing an example in which the first grid 140 of a wire grid polarizer has a semi-circular curve, not a stripe shape. FIGS. 9 to 11 are diagrams illustrating a method of manufacturing the wire grid polarizer shown in FIG. 8. The processes and structures shown in FIGS. 9 to 11 are the same as those of FIGS. 2 and 5 to 7, and a description thereof is omitted. However, in the case in which the cross section of the first grid has a semi-circle or a semi-ellipse and the external surface of the first grid has curvature, the width F of the first grid and the interval G between the first grids are defined on the basis of a vertical line which is drawn down from a point where the horizontal line of a point, half the height E of the first grid, and the curvature of the first grid bring into contact with each other.

Figure 12:
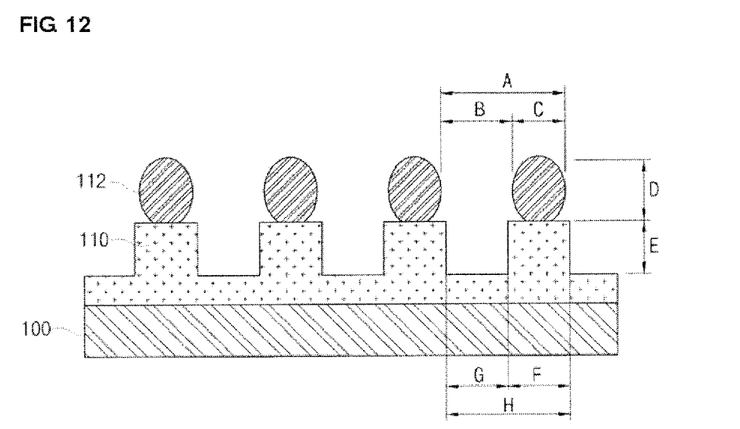
FIG. 12 shows the structure of a wire grid polarizer according to another embodiment of the present invention.

Further, as in a structure shown in FIG. 12, the first grids 110 can have a stripe shape and the cross section of the second grid can have a circle or an ellipse. A wire grid polarizer, such as that shown in FIG. 12, can be implemented by sequentially forming the first grids 110 and the second grid base layer and then controlling the wet etch process.

Figure 13:
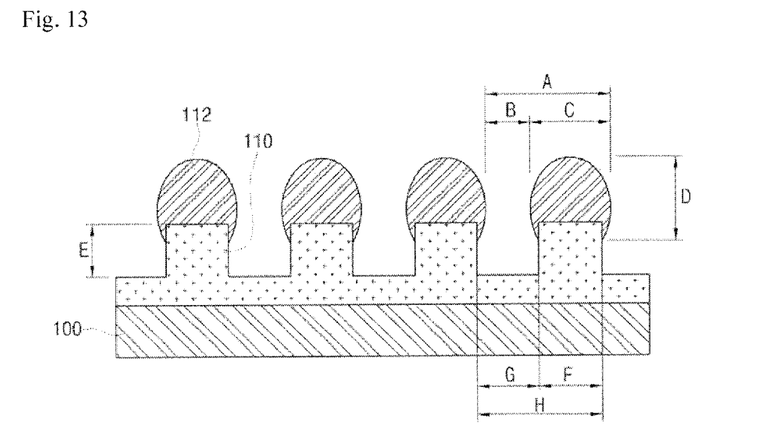
FIG. 13 shows the structure of a wire grid polarizer according to yet another embodiment of the present invention.

FIG. 13 shows another embodiment of the present invention. In the case in which the ratio of the width F of the first grid to the width C of the second grid satisfies F:C=1:(0.2 to 1.5) in a preferred embodiment of the present invention, the width C of the second grid can be wider than the width F of the first grid as shown in FIG. 13. That is, FIG. 13 shows a structure in which the width C of the second grid is 1 to 1.5 times greater than the width F of the first grid. In this case, the external surface of the second grid may have an elliptical curvature, a stripe shape, or a quadrangle shape.

Figure 14:
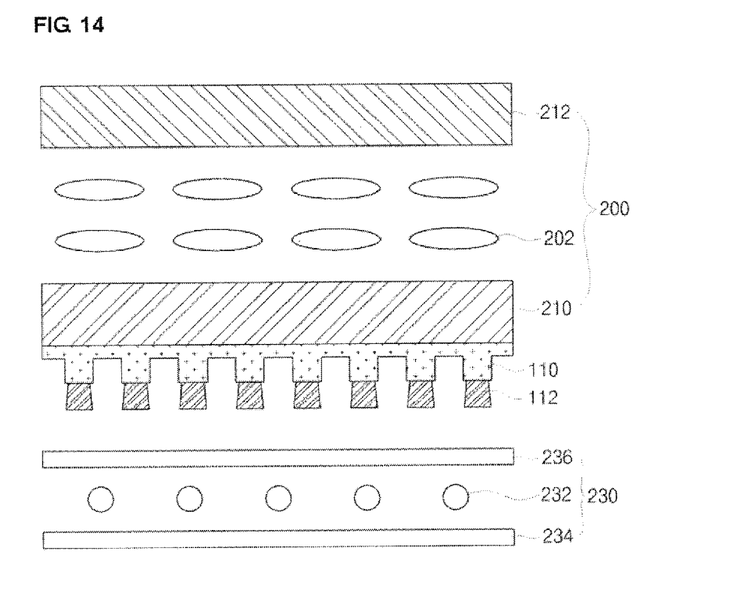
FIG. 14 is a cross-sectional view showing a liquid crystal device including the wire grid polarizer according to the present invention.

FIG. 14 is a cross-sectional view showing a liquid crystal device including the wire grid polarizer according to the present invention.

Referring to FIG. 14, the liquid crystal device according to an embodiment of the present invention includes a liquid crystal display panel 200, a backlight unit 230 for supplying light to the liquid crystal display panel 200, and the wire grid polarizer. The wire grid polarizer is patterned on the upper or lower part of the liquid crystal display panel 200 or any one surface of an optical sheet included in the backlight unit 230. The backlight unit 230 includes light sources 232, a diffusion sheet 236 configured to diffuse light generated by the light sources 232, and a reflection sheet 234 placed under the light sources 232.

The light source 232 can be formed of any one of a Cold Cathode Fluorescent Lamp (CCFL), an External Electrode Fluorescent Lamp (EEFL), and a Light Emitting Diode (LED). The light source 232 generates light and outputs the light toward the diffusion sheet 236.

The reflection sheet 234 is made of materials with high reflection efficiency. The reflection sheet 234 functions to reflect light, traveling in an opposite direction to the liquid crystal display panel 200, toward the diffusion sheet 236 in order to reduce the loss of light.

The diffusion sheet 236 directs light, received from the light sources 232, toward the front of the liquid crystal display panel 200 and diffuses the light in such a way as to have a uniform distribution in a wide range so that the light is radiated to the liquid crystal display panel 200. A film, made of transparent resin having a member for light diffusion coated on both surfaces, preferably is used as the diffusion sheet 236.

The liquid crystal display panel 200 includes a color filter substrate 212 and a thin film transistor substrate 210 coalesced with the color filter substrate 212 with the liquid crystal layer 202 interposed therebetween.

A color filter array, including black matrices configured to prevent the leakage of light, a color filter configured to implement colors, a common electrode configured to form a vertical electric field along with pixel electrodes, and upper orientation film coated on the electrodes for the orientation of liquid crystals, is formed on the upper substrate of the color filter substrate 212. Further, a thin film transistor array, including gate lines and data lines formed to cross each other, thin film transistors each formed at the intersection of the gate line and the data line, pixel electrodes connected to the thin film transistors, and a lower orientation film coated on the pixel electrodes and the thin film transistors for the orientation of liquid crystals, is formed on the lower substrate of the thin film transistor substrate 210.

Although the present invention has been described in connection with the embodiment of the present invention illustrated in the accompanying drawings, it is not limited thereto. It will be apparent to those skilled in the art that various substitutions, modifications and changes may be made thereto without departing from the scope and spirit of the invention.

As shown in FIG. 14, the wire grid polarizer according to the present invention can be formed under the liquid crystal display panel 200 or can be formed on the upper part of the liquid crystal display panel 200 or on any one surface of an optical sheet included in the backlight unit 230.

Further, the wire grid polarizer according to the present invention may be attached to the surface of a liquid crystal module as shown. A plurality of the wire grid polarizers may be arranged at certain intervals. Moreover, the second grids may be oriented upward or downward.

Further, the wire grid polarizer according to the present invention includes the first grids 110, arranged in parallel at certain intervals on the lower part of the liquid crystal display panel 200, and the second grids 112 formed on the first grids 110.

The wire grid polarizer according to the present invention can be applied to display devices capable of implementing a 3-D stereoscopic image in addition to the above-described liquid crystal device. Accordingly, the wire grid polarizer according to the present invention can be widely used to implement a high brightness and realize high reliability.

According to the present invention, the wire grid polarizer, including the first grids arranged in parallel at certain intervals over the substrate and the second grids formed on the first grids, can be fabricated using only the imprint process, the deposition process, and the wet etch process. Accordingly, there are advantages in that the number of processes and the process costs and time can be reduced and reliability can be guaranteed.

Further, the second grid is formed to have an optimal height and an optimal width through the wet etch process. Accordingly, there are advantages in that transmittance and brightness can be improved and polarization efficiency can be increased.

While the invention has been shown and described with respect to some exemplary embodiments, it will be understood by those skilled in the art that various changes and modifications may be made without departing from the spirit and scope of the invention as defined in the following claims.

What is claimed is:

1. A wire grid polarizer, comprising:
    a substrate;
    a first grid layer disposed on the substrate, comprising at least one first grid, and having a certain pitch and height; and
    a second grid layer comprising at least one second grid, having a certain pitch and height, on the first grid;
    wherein a ratio of a width of the first grid to a width of the second grid satisfies 1:(0.2 to 1.5),
    wherein a height of the first grid layer is larger than the height of the first grid,
    wherein the first grid layer and the first grid are made of a polymer material,
    wherein the substrate comprises a material different from the polymer material of the first grid layer,
    wherein a width of an upper surface of the first grid is larger than a width of a lower surface of the second grid, and
    wherein the second grid comprises side surfaces having an inclination with respect to the lower surface of the second grid.

2. The wire grid polarizer of claim 1, wherein the second grid is made of a metal material.

3. The wire grid polarizer of claim 2, wherein a ratio of the width of the second grid to an interval between the second grids satisfies 1:(0.2 to 1.5).

4. The wire grid polarizer of claim 2, wherein a ratio of the width of the second grid to the height of the second grid satisfies 1:(1 to 5).

5. The wire grid polarizer of claim 2, wherein a ratio of the pitch of the second grid to the height of the second grid satisfies 1:(1 to 5).

6. The wire grid polarizer of claim 1, wherein a ratio of the width of the first grid and an interval between the first grid satisfies 1:(0.2 to 1.5).

7. The wire grid polarizer of claim 6, wherein a ratio of the width of the first grid to the height of the first grid satisfies 1:(0.2 to 5).

8. The wire grid polarizer of claim 1, wherein the pitch of the second grid or the pitch of the first grid ranges from 50 nm to 1 µm.

9. The wire grid polarizer of claim 8, wherein a cross section of at least one of the first and second grids is a circle, ellipse, or polygon.

10. A liquid crystal device, comprising:
    a liquid crystal display panel;
    a backlight unit configured to supply light to the liquid crystal display panel; and
    a wire grid polarizer according to claim 1, wherein the wire grid polarizer is formed on an upper or lower part of the liquid crystal display panel or on any one surface of a plurality of optical sheets included in the backlight unit and configured to increase efficiency of light.

11. The liquid crystal device of claim 10, wherein the wire grid polarizer is formed such that a ratio of a width of a first grid to an interval between the first grids satisfies 1:(0.2 to 1.5) or a ratio of the width of the first grid to a height of the first grid satisfies 1:(0.2 to 5).

12. A 3-D stereoscopic image display device comprising a wire grid polarizer according to claim 1.

13. The wire grid polarizer of claim 1, wherein the upper surface of the first grid comprises a first portion contacted with the second grid and a second portion extended from the first portion.

14. The wire grid polarizer of claim 13, wherein the first portion of the upper surface of the first grid directly contacts the lower surface of the second grid.

15. The wire grid polarizer of claim 13, wherein the second portion is not contacted with the second grid.

* * * * *